United States Patent
Dawley

[19]

[11] Patent Number: 5,845,555
[45] Date of Patent: Dec. 8, 1998

[54] MULTI-POSITION ADJUSTABLE WORK STOP ASSEMBLY

[76] Inventor: James Alonzo Dawley, 1938 Chase Rd., Waterloo, N.Y. 13165

[21] Appl. No.: 702,341

[22] Filed: Aug. 23, 1996

Related U.S. Application Data

[63] Continuation of Ser. No. 342,964, Nov. 21, 1994, abandoned.

[51] Int. Cl.$^6$ ........................................... B26D 7/02
[52] U.S. Cl. ...................... 83/467.1; 83/468.7; 83/522.25
[58] Field of Search ................... 83/467.1, 468, 83/468.6, 468.7, 438, 522.19, 522.24, 522.25; 269/303, 304, 315; 144/286 A, 286 R

[56] References Cited

U.S. PATENT DOCUMENTS

| | | | |
|---|---|---|---|
| 2,485,274 | 10/1949 | Garrett | 83/468 |
| 2,618,300 | 11/1952 | Freudenthaler | 83/468 |
| 2,890,729 | 6/1959 | Horn | 143/168 |
| 3,124,181 | 3/1964 | Clemans | 269/315 |
| 3,348,591 | 10/1967 | Carrasco | 143/168 |
| 3,994,484 | 11/1976 | Schorr | 269/315 |
| 4,111,088 | 9/1978 | Ziegelmeyer | 83/471.2 |
| 4,256,000 | 3/1981 | Seidel | 83/468 |
| 4,412,468 | 11/1983 | Bucy | 83/468 |
| 4,693,158 | 9/1987 | Price | 83/468 |
| 4,745,834 | 5/1988 | Neumann | 83/468 |
| 4,785,550 | 11/1988 | Wilkins | 83/468 X |
| 4,828,446 | 5/1989 | Lauffer | 83/468.6 X |
| 4,871,156 | 10/1989 | Kozyrski et al. | 269/303 |
| 4,901,992 | 2/1990 | Dobeck | 83/468 X |
| 4,986,323 | 1/1991 | Lemaire, Jr. | 83/467.1 X |
| 5,337,641 | 8/1994 | Duginske | 83/468 |

*Primary Examiner*—Maurina T. Rachuba
*Attorney, Agent, or Firm*—J. Addison Mathews

[57] ABSTRACT

A multi-position adjustable work stop assembly employs a traveling gauge assembly that cooperates with independently adjustable and inexpensive location stops. The gauge assembly is moveable along a fence to define a plurality of work locating positions determined by the location stops. An engagement or contact member on the gauge assembly selectively intercepts the location stops to precisely locate the gauge assembly in the desired positions. The engagement member is an arm mounted for movement between first and second positions on the gauge assembly. In the first position the engagement member intercepts the location stops when the gauge assembly is moved longitudinally on the fence. In the second position the engagement member clears the location stops during such movement.

19 Claims, 5 Drawing Sheets

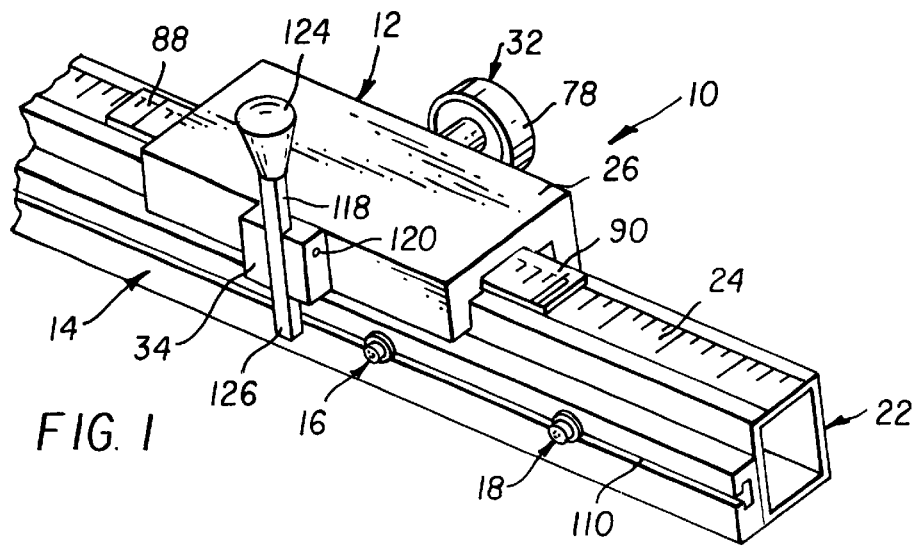
FIG. 1
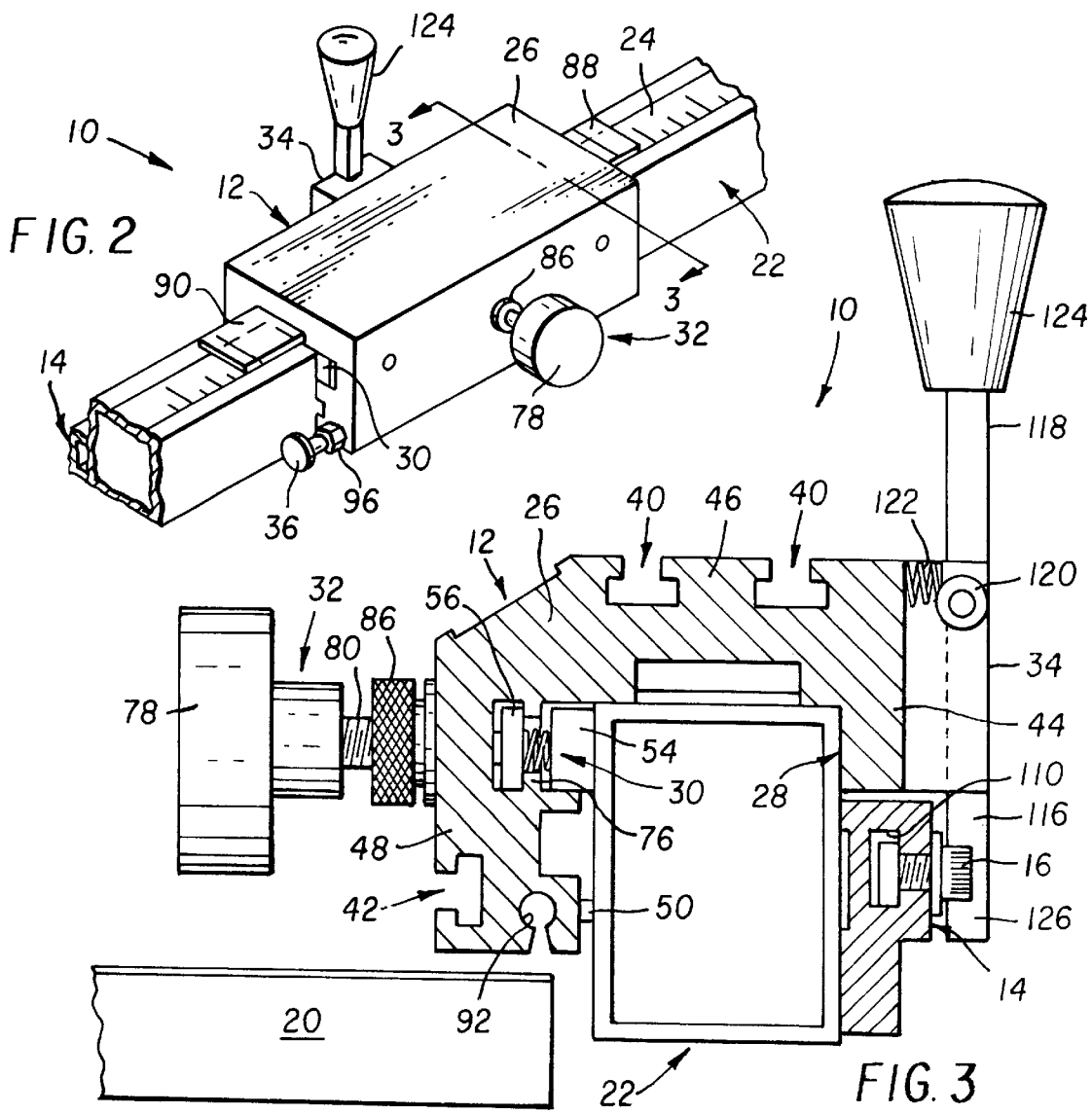
FIG. 2
FIG. 3

005,845,555

MULTI-POSITION ADJUSTABLE WORK STOP ASSEMBLY

CROSS REFERENCE TO RELATED APPLICATION

This is a continuation of my application Ser. No. 08/342,964, filed Nov. 21, 1994, now abandoned entitled Multi-Position Adjustable Work Stop Assembly.

BACKGROUND OF THE INVENTION

1. Field of Invention

The invention relates to adjustable stops for positioning work relative to an operating station, and more specifically to a multi-position adjustable work stop having particular utility with a cut-off device for establishing the length of cut.

2. Description of the Prior Art

Numerous jigs, fixtures and gauges have been provided for locating work relative to cut-off saws and other operating stations. Examples include traveling blocks positioned on or against a work fence that act as stops defining the length of work cut by the saw. The location of the block usually is established by a graduated tape, or other measure, marked with distances from the saw blade. Once the block is locked at the desired distance, the same length of work can be cut repeatedly with no additional set-up. More sophisticated devices include moveable parts adjustable in fine increments relative to the rest of the block to establish the work length more precisely. Quick release features are also available for moving the block from one locked position to another, when multiple lengths are required, or for removing the block from its work stopping position to permit alternative operations.

Other examples address the problem of multiple lengths by replicating the stop blocks and mounting several similar blocks in the desired positions along the fence. Usually the blocks can be moved easily between active and inactive positions, depending on which block represents the desired length.

PROBLEM SOLVED BY THE INVENTION

Prior art approaches, such as those noted above, provide many advantages for locating work relative to an operating station. It will become apparent, however, that significant additional benefits are available according to the teaching of the present specification.

Known devices are inconvenient or unduly expensive when used to cut different lengths. Single block devices must be moved and repositioned whenever the length changes. This is particularly inconvenient within a single job when the time is short, even with quick release features. Equally aggravating, the required adjustments are difficult to repeat with precision.

Multiple stop blocks, one positioned at each of the desired lengths, can reduce the set-up difficulties noted above, but introduce their own disadvantages. If the stop blocks are precise instruments with sophisticated features, their use in multiple sets rapidly increases cost. When the cost is constrained, on the other hand, the multiple stop blocks almost certainly must be simplified with fewer features and reduced precision.

SUMMARY OF THE INVENTION

The present invention is directed to overcoming one or more of the problems set forth above. Briefly summarized, according to one aspect of the invention, a multi-position adjustable work stop employs a traveling gauge assembly that cooperates with independently adjustable and inexpensive location stops. The gauge assembly is moveable along a fence to define a plurality of work locating positions determined by the location stops. An engagement or contact member on the gauge assembly selectively intercepts the location stops during movement of the gauge assembly and thereby precisely locates the gauge assembly in the desired positions. Since only one gauge assembly is required, it can include many precise and sophisticated features without multiplying the cost. The location stops, on the other hand, comprise simple and inexpensive parts that can be used in multiple quantities, without significantly increasing cost.

According to more specific features, the location stops are supported on a track running parallel to the fence, and include a locking mechanisms that draws the location stops against the track to secure them in the desired positions. The engagement member is an arm mounted for movement between first and second positions on the gauge assembly. In the first position the engagement member intercepts the location stops when the gauge assembly is moved longitudinally on the fence. In the second position the engagement member clears the location stops during such movement.

Still more specifically, the track includes a T-slot. The location stops each include a first portion captured in the T-slot and a second portion defining an abutment element or head that is intercepted by the engagement member. The gauge assembly defines a three-sided channel for receiving and riding on the fence and a pressure bar in the channel is biased to engage the fence to stabilize the gauge assembly. The gauge assembly also includes features for securing numerous alternative accessories to the assembly.

According to an alternative embodiment of the invention, a pneumatic actuating device moves the engagement member between the first or intercepting and second or clearing positions.

These and other features and advantages of the invention will be more clearly understood and appreciated from a review of the following detailed description of the preferred embodiments and appended claims, and by reference to the accompanying drawings.

BRIEF DESCRIPTION OF THE DRAWINGS

FIGS. 1 and 2 are simplified back and front perspective views of a multi-position adjustable work stop assembly including a traveling gauge assembly and location stops according to a preferred embodiment of the invention.

FIG. 3 is a cross sectional view of the work stop assembly taken along section line 3—3 in FIG. 2.

DESCRIPTION OF THE PREFERRED AND ALTERNATIVE EMBODIMENTS

Figure 4:
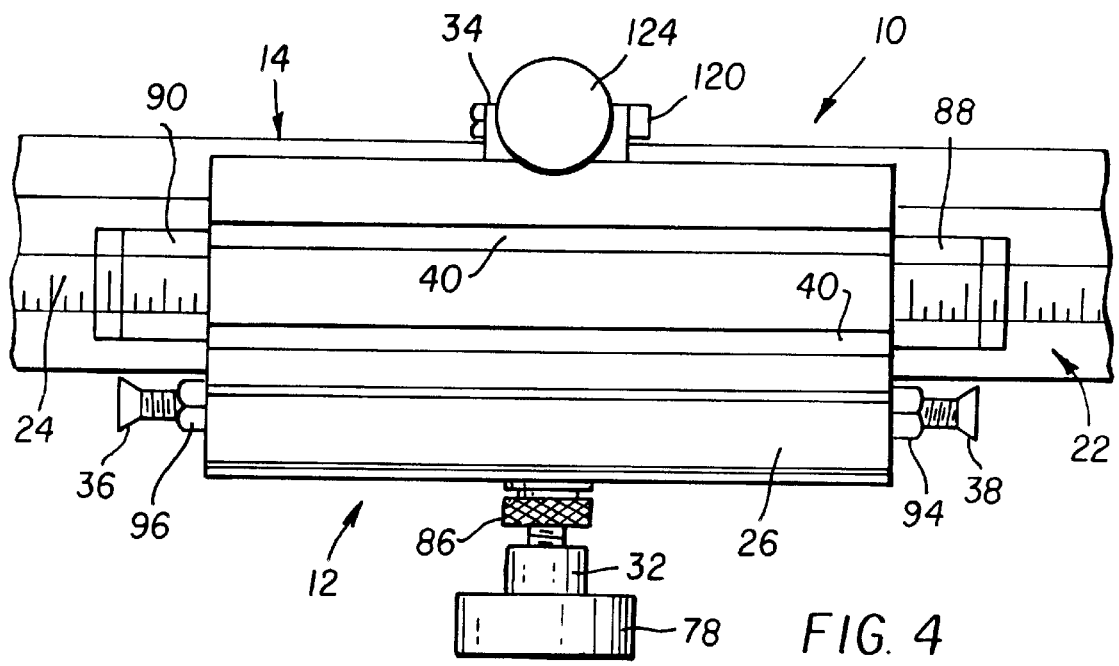
FIGS. 4 and 5 are top and bottom elevational views of the work stop assembly of FIG. 1, depicting its various components.

Referring now to the drawings, and beginning with FIGS. 1–3, a preferred embodiment of the invention is disclosed as a multi-position adjustable work stop assembly 10, including traveling gauge assembly 12, track 14 and multiple location stops 16 and 18. The preferred embodiment is illustrated for use with a power tool, such as a cut-off saw, including an operating station (not shown), work bench 20 (FIG. 3) and fence 22. A calibrated tape 24, or other suitable indicia, is provided for marking the distance from the operating station.

Traveling gauge assembly 12 is illustrated most clearly in FIG. 3, and includes an extruded work stop body 26 defining an interior channel 28 (FIG. 3), a pressure bar assembly 30, a locking mechanism 32, a positioning device 34, work contact elements 36 and 38 (FIG. 4), and various surface structure 40 and 42 for receiving accessories, as will be described.

Channel 28 is formed by three wall sections: a shortened back wall section 44, a recessed top wall section 46, and a relieved front wall section 48. Taken together, the three wall sections are adapted to straddle fence 22, loosely supporting the traveling gauge assembly 12 for sliding movement to any desired position along the fence. Wall sections 44 and 46 include surfaces that engage the fence directly. Wall section 48, on the other hand, supports pressure bar assembly 30, and nylon bushings 50, that engage the fence with some pressure to stabilize the stop body on the fence.

Figure 6:
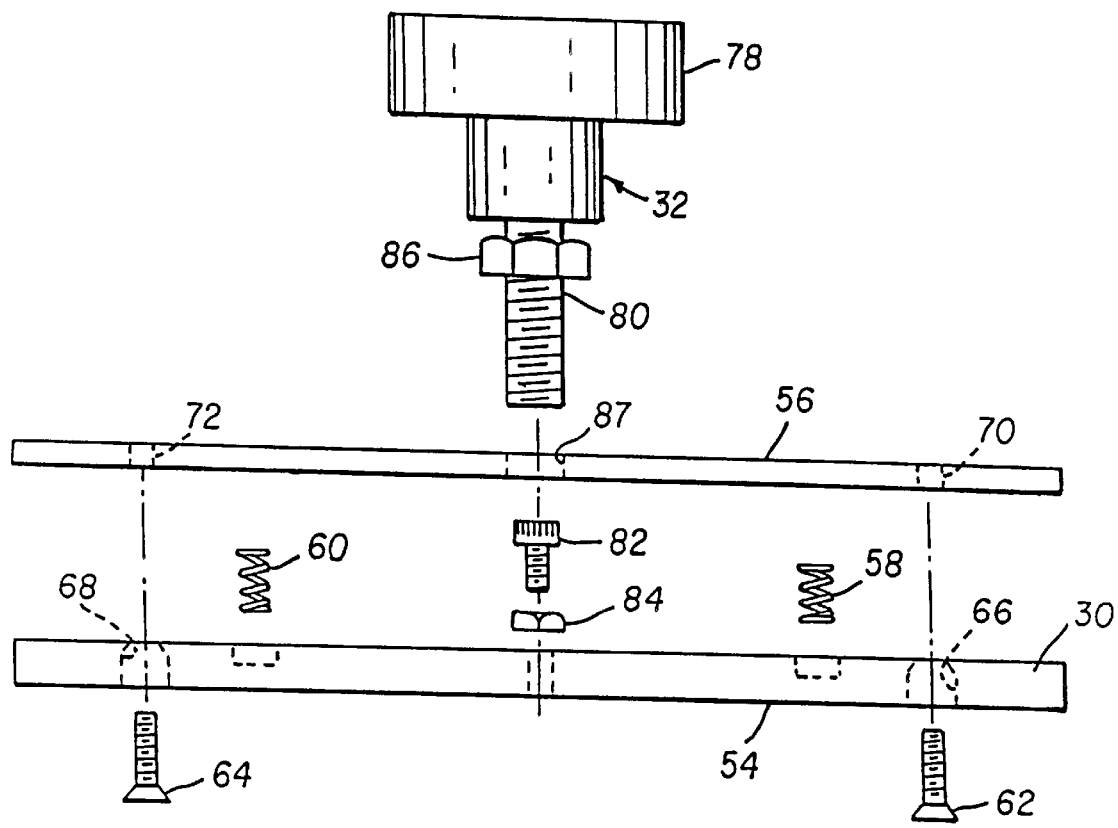
FIG. 6 is a an exploded view of a pressure bar assembly forming part of the work stop assembly of FIG. 1.

Bushings 50 are threaded into wall section 48 and are adjustable to define a distance from the back wall section 44 that is just slightly greater than the width of the fence, resisting rocking or twisting of the gauge assembly on the fence. Pressure bar assembly 30 is depicted most clearly in FIGS. 3 and 6, and includes front and back plates 54 and 56 biased apart by springs 58 and 60, but held together by machine screws 62 and 64. Screws 62 and 64 are received through countersunk and oversized holes 66 and 68 in the front plate, which permit movement of front plate on the screws under the bias of springs 58 and 60. Screws 62 and 64 are threaded into the back plate at 70 and 72, and project beyond the back plate to engage wall section 48, pushing the back plate against abutments shoulders 76 (FIG. 3). The screws 62 and 64 thus lock the back plate against the shoulders 76 and securely hold the pressure bar assembly 30 in the work stop body 26. With the back plate 56 locked in place, springs 58 and 60 bias the front plate against the fence 22 with uniform pressure. The pressure applied by springs 58 and 60 is sufficient to hold the gauge assembly squarely in position on the fence, but still permits longitudinal movement of the gauge assembly along the fence to adjust its distance from the operating station.

Once the gauge assembly is properly positioned for the desired length of cut, it is secured in place by locking mechanism 32. Mechanism 32 includes knob 78, stud 80, contact member 82 (FIG. 6) and check nuts 84 and 86. Stud 80 is threaded into front wall section 48 of stop body 26. When knob 78 is rotated clockwise, for example, the stud advances through hole 87 in back plate 56 and toward front plate 54 of pressure bar assembly 30. When the stud engages contact member 82, it forces front plate 54 against the fence, securely locking the gauge assembly in position on the fence. Check nut 86 is then hand tightened to hold the parts in the locked position. Threads on stud 80 apply substantial leverage against front plate 54, and the front plate has a long surface of contact with the fence, so the stop body provides a stable platform for mounting other fixtures on the stop body. Check nut 86 also may be applied to hold stud 80 snugly against front plate 54, but without sufficient pressure to lock the gauge assembly in position. The gauge assembly then could be moved to the desired position, and would remain there under most operating conditions, without the need to lock it in place.

Figure 5:
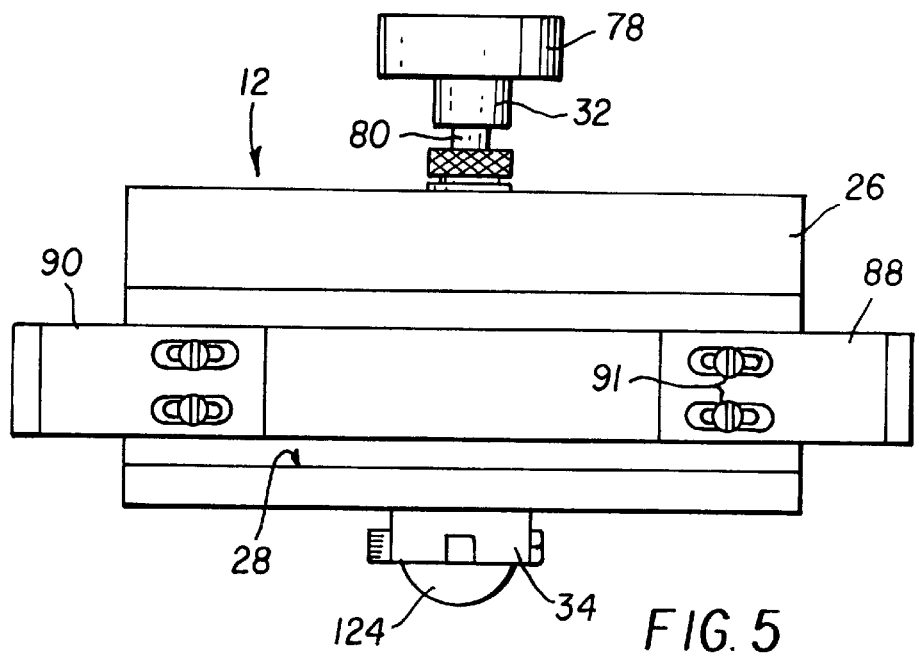

The previously mentioned recess in wall section 46 accommodates transparent view plates 88 and 90 (FIGS. 1, 4 and 5), including hairline markers overlying graduated tape 24 on fence 22. Readings on the tape indicate the distance between the saw or operating station and the traveling gauge assembly to indicate the length of work to be cut. As depicted most clearly in FIG. 5, transparent plates 88 and 90 are secured to the stop body by screws 91 that can be loosened to permit adjustment of the hairlines relative to work contacting elements 36 and 38.

Contact elements 36 and 38 (FIG. 4) include flat headed machine bolts threaded into holes 92 (FIG. 3) from both ends of the stop body 26. The machine bolts of contact elements 36 and 38 are adjusted in cooperation with view plates 88 and 90, so the reading on tape 24 corresponds to the distance from the contact elements 36 and 38 to the operating station. Check nuts 94 and 96 (FIG. 4) are then tightened to lock the bolts in position.

Figure 8:
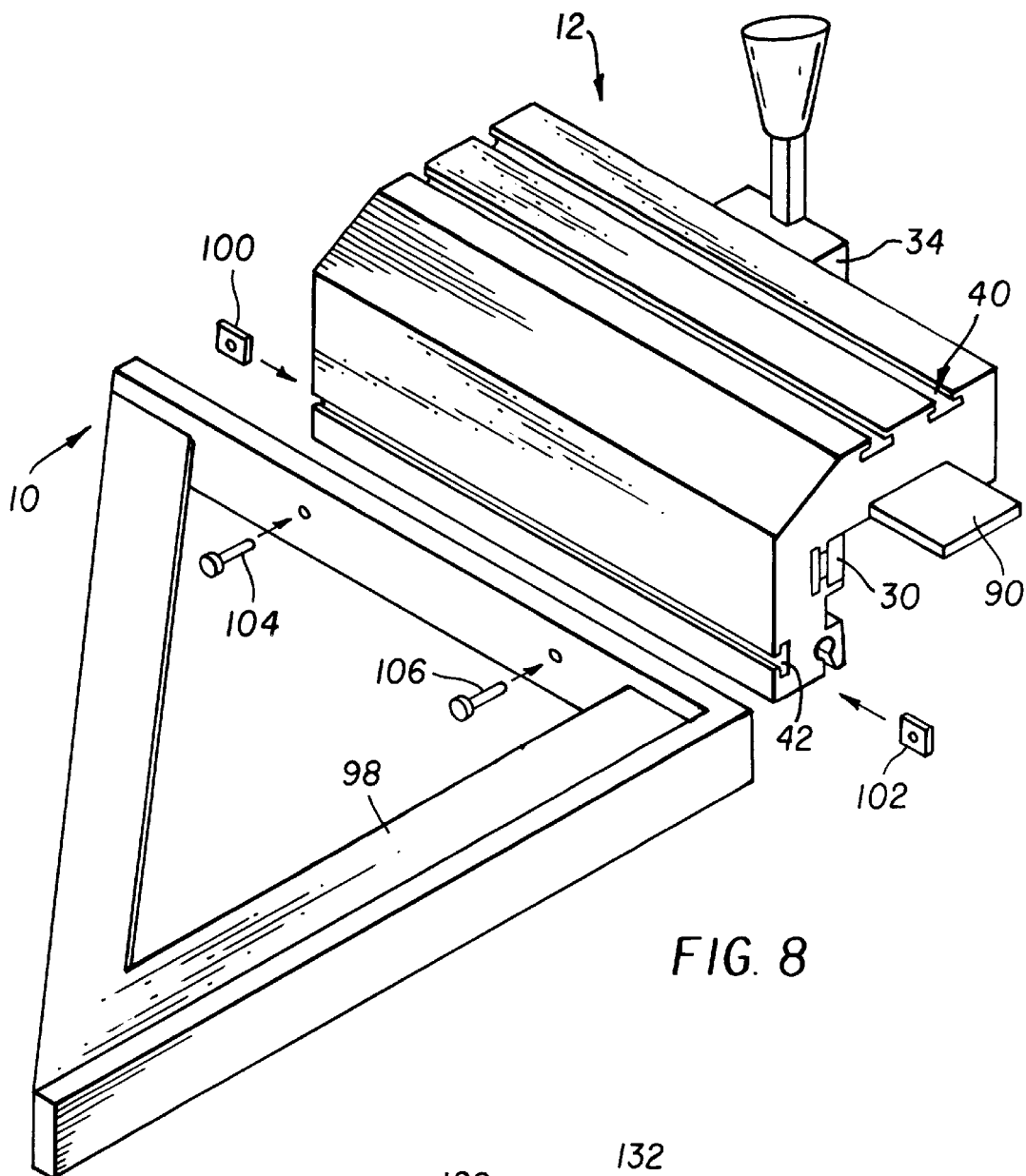
FIG. 8 is a perspective view of an accessory for use with the preferred embodiment.

The gauge assembly 12 is particularly versatile for mounting and locating a variety of jigs, fixtures and measuring tools on the body section. Surface structure 40 and 42 includes one or more T slots that can receive tools, such as the gang stop 98 illustrated in FIG. 8. Square nuts 100 and 102 are inserted into the T-slots. Machine screws 104 and 106 are then inserted through holes in gang stop 98 and tightened to draw the gang stop against the body 26 of traveling gauge assembly 12. Screws 104 and 106 are vertically centered, permitting left or right facing attachment of the gang stop. This is but one example of many alternative tools that can be mounted to the front or top of the assembly. Other examples include inside and outside miter fences and hold down devices.

Figure 7:
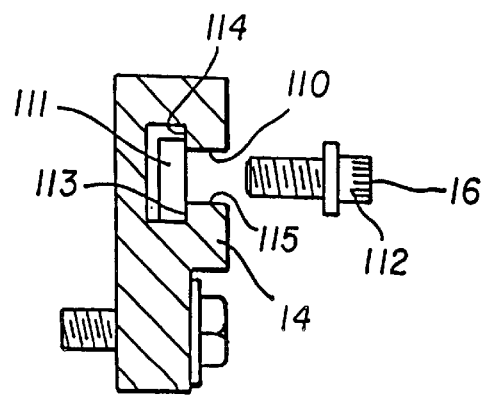
FIG. 7 is a cross sectional view of a track including T-slot according to one feature of the preferred embodiment.

According to particularly advantageous features of the invention, track 14 is secured to the back of fence 22 for receiving a plurality of the location stops 16 and 18. The track includes a T-slot 110 (FIGS. 1, 3 and 7) running lengthwise parallel to fence 22, and preferably open at one or both ends. Location stops 16 and 18 independently slide lengthwise in the slot and are adapted to be anchored in selected positions of adjustment along the track. The location stops each comprise supporting means illustrated in this preferred embodiment as a first portion 111 (FIG. 7), such as a square nut, captured in the T-slot, and a second portion 112, such as the head of a machine screw, defining an abutment element or head preferably extending outside the T-slot. The first and second portions 111 and 112 support the location stops for longitudinal movement relative to each other parallel to the fence, thereby defining means for adjusting the relative longitudinal spacing between the respective location stops.

The bottom section 113 (FIG. 7) of track 110 is shallower than top section 114, supporting the nut portion 112 with its tapped center hole aligned with the opening 115 in T-slot 110. This facilitates mating of the first and second portions 111 and 112 when they are threaded together through opening 115. After threading, the first and second portions of each location stop are drawn together against the track by rotating one relative to the other. Of course other approaches, such as locking cams, also are within the scope of the invention. In this preferred embodiment the threaded first and second portions 111 and 112, or the locking cams, cooperate with the T-slot to define the anchoring means.

Positioning device 34 includes a contact or engagement member 116 (FIG. 3) mounted on the stop body and moveable between first and second positions. In the first position of the engagement member, it intercepts the abutment elements when the gauge assembly moves along the fence. In the second position, the engagement member clears the abutment elements during such movement. When the work stop moves on the fence, the contact or engagement member 116 intercepts the respective location stops 16, 18, in the first position and clears the respective location stops 16, 18 in the second position, thereby selectively engaging the respective location stops to establish the work stop in a plurality of work locating positions.

Preferably the engagement member is a lever arm 118 pivotally mounted at 120 on the back wall section of the gauge assembly 12 and biased toward the first or intercepting position by spring 122. The lever easily is moved to the second or clearing position by manually moving handle 124 toward the front of the gauge assembly, pivoting the opposite end 126 of the lever away from the abutment elements of the location stops 16 and 18.

The lever arm 118 in the preferred embodiment also is positioned centrally of the gauge assembly, and is the same thickness as the head 112 of location stops 16 and 18. This permits movement of the gauge assembly into position from either direction, right or left, and also on either side of the operating station, without additional adjustments.

Figure 9:
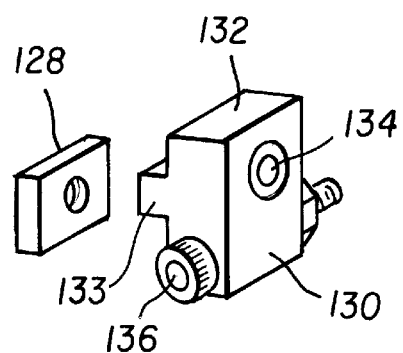
FIG. 9 is a perspective view of a location stop according to an alternative embodiment of the invention.

An alternative design for the location stops 16 and 18 is depicted in FIG. 9. First portion 128 is a square nut, the same as the preferred embodiment. Second portion 130, however, defines a rectangular head 132 including a rectangular extension 133 adapted to fit in the T-slot. Head 132 receives a bolt 134, threaded through the head and into the square nut 128 for drawing the first and second portions together against the track. Finer location is provided by an adjustable member 136 that is threaded into the head 130.

Figure 10:
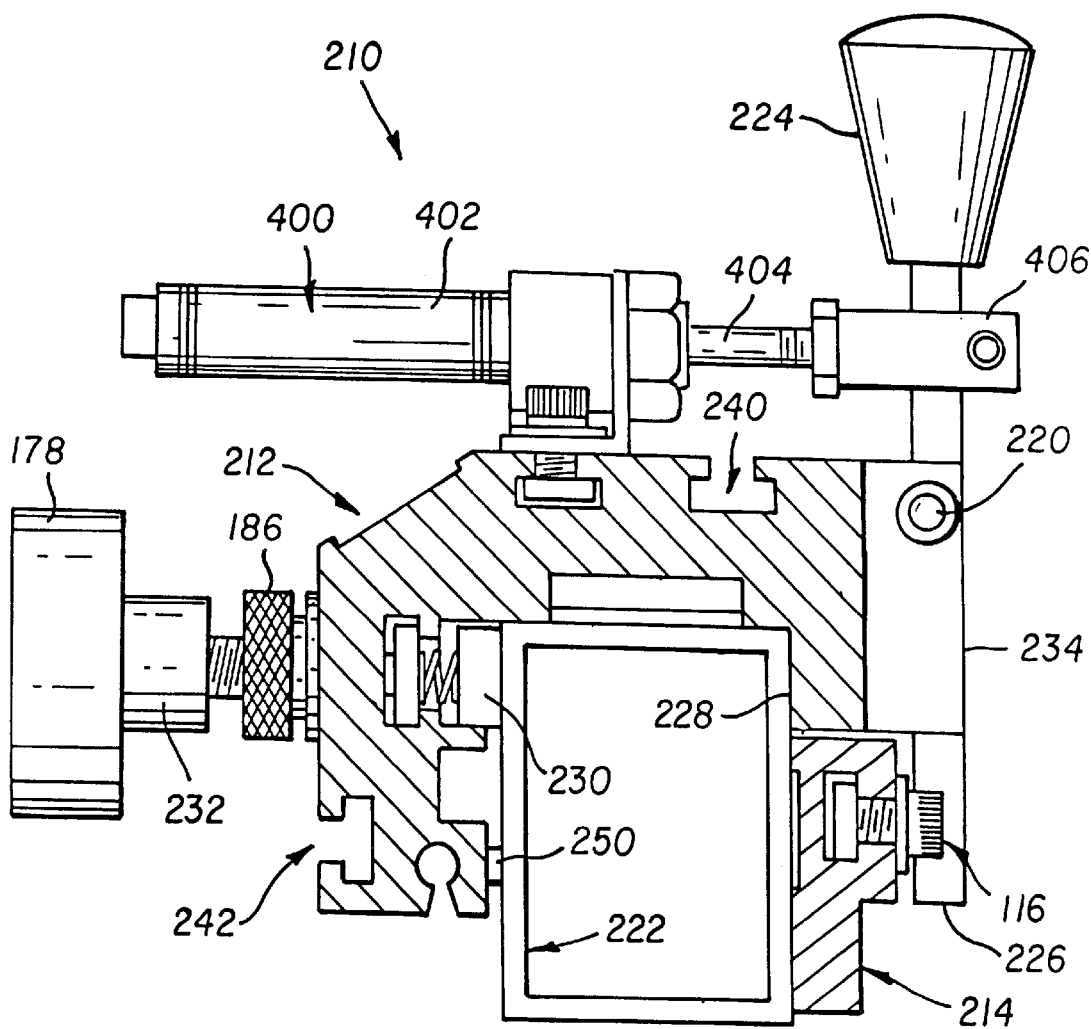
FIG. 10 is a cross sectional view corresponding to FIG. 3, but depicting a pneumatic actuator according to an alternative embodiment of the invention.

FIG. 10 illustrates an alternative embodiment of the invention including a pneumatic operating device 400. The embodiment of FIG. 10 is similar to the preferred embodiment in many respects that will not be separately described. Common parts are identified in FIG. 10 by adding one hundred to the corresponding reference numerals used in FIGS. 1–8. Alternative or additional features are identified by numerals starting with 400.

Pneumatic operating device 400 includes a reverse single acting piston inside cylinder 402 and coupled to piston rod 404. The piston rod 404 is coupled to the lever arm 118 by a pin and clevis 406. Pressure is directed selectively to the piston by a foot petal to extend the piston in the cylinder 402, moving the lever arm its intercepting position to its clearing position. When the pneumatic pressure is released, the lever arm returns to its intercepting position under a spring bias.

Still other embodiments not specifically illustrated include the equivalent of track 14 built into the work fence 22 along its back, top or front wall sections.

It should now be apparent that the invention provides a work stop assembly that is particularly versatile and easy to use. The location stops can be positioned once or infrequently and left in position for subsequent operations. The location stops selectively can be used or bypassed by moving the lever arm between its intercepting and clearing positions. The traveling gauge assembly can be removed from the work bench and later returned precisely to the same positions with little or no additional set-up. The location stops are inexpensive, permitting many stops and location positions without significantly increasing cost.

While the invention is described in connection with a preferred and alternative embodiments, other modifications and applications will occur to those skilled in the art. The claims should be interpreted to fairly cover all such modifications and applications within the true spirit and scope of the invention.

PARTS LIST FOR FIGURES

| PARTS LIST FOR FIGURES | |
|---|---|
| Reference No. | Part |
| 10. Multi-position adjustable work stop assembly. | 72. Threaded hole. |
| | 76. Shoulders. |
| | 78. Knob. |
| 12. Traveling gauge assembly. | 80. Stud. |
| | 82. Engagement or contact member. |
| 14. Track. | |
| 16. Location stop. | 84. Check nut. |
| 18. Location stop. | 86. Check nut. |
| 20. Work bench. | 87. Hole. |
| 22. Fence. | 88. View plate. |
| 24. Calibrated tape. | 90. View plate. |
| 26. Work stop body. | 91. Hole |
| 28. Interior channel. | 92. Hole. |
| 30. Pressure bar assembly. | 94. Check nut. |
| 32. Locking mechanism. | 96. Check nut. |
| 34. Positioning device. | 98. Square. |
| 36. Contact element. | 100. Nut. |
| 38. Contact element. | 102. Nut. |
| 40. Surface structure. | 104. Screw. |
| 42. Surface structure. | 106. Screw. |
| 44. Back wall section. | 110. T-slot. |
| 46. Top wall section. | 111. First portion. |
| 48. Front wall section. | 112. Second portion. |
| 50. Nylon bushings. | 113. Bottom section. |
| 54. Front plate. | 114. Top section. |
| 56. Back plate. | 115. Opening or horizontal section. |
| 58. Spring. | |
| 60. Spring. | 116. Contact or engagement member. |
| 62. Screw. | |
| 64. Screw. | 118. Lever arm. |
| 66. Oversized hole. | 120. Pivot pin. |
| 68. Oversized hole. | 122. Spring. |
| 70. Threaded hole. | 124. Handle. |
| 126. Opposite end. | |
| 128. First portion. | |
| 130. Second portion. | |
| 132. Head. | |
| 133. Extension. | |
| 134. Bolt. | |
| 136. Adjustable member. | |
| 400. Pneumatic device. | |
| 402. Cylinder. | |
| 404. Piston rod. | |
| 406. Clevis. | |

What is claimed is:

1. A Multi-position adjustable work-stop assembly for use with an elongate fence, said work-stop assembly comprising:

a plurality of spaced location stops, said location stops including means supporting said location stops for longitudinal movement relative to each other parallel to said fence, thereby to adjust the relative longitudinal spacing between said respective location stops;

means for anchoring said respective location stops in selected positions of adjustment;

a work stop moveable on said fence, said work stop including a contact member; and, means mounting said contact member and said respective location stops for relative movement between first positions and second positions, said contact member in said first positions intercepting said respective location stops when said work stop moves on said fence, said contact member in said second positions clearing said respective location stops when said work stop moves on said fence, said contact member thereby selectively engaging said respective location stops to establish said work stop in a plurality of work locating positions.

2. The invention of claim 1, wherein said location stops are supported by an elongate track coupled to said fence, said track includes a T-slot running lengthwise of said track, and said location stops each include a first portion captured in said T-slot and a second portion engageable by said contact member in said first positions.

3. The invention of claim 2, wherein said T-slot defines a vertical slot having top and bottom sections and a horizontal slot intercepting said vertical slot between said top and bottom sections, and said bottom section is shallower than said top section.

4. The invention of claim 3, wherein said location stops each include means for drawing said first and second portions together releasably to secure said location stops against said track.

5. The invention of claim 1, wherein said contact member is an arm mounted on said work stop for pivotal movement between said first and second positions, and further including means for biasing said arm toward one of said first and second positions.

6. The invention of claim 5, further including a pneumatic actuating device for moving said arm between said first and second positions.

7. A work-stop assembly for use with a fence on a work table; said assembly comprising:
   an elongate track including means for mounting said track on said work table parallel to said fence;
   a plurality of adjustable location stops including means supporting said location stops for movement relative to each other longitudinally on said track, said longitudinal movement adjusting the relative longitudinal spacing between said respective location stops, each of said respective location stops including an abutment element and a locking mechanism for securing said abutment element in a selected position of adjustment on said track;
   a traveling gauge assembly including means for constraining said gauge assembly to longitudinal movement against said fence, said gauge assembly including an engagement member having a first position for intercepting said location stops during said longitudinal movement, said engagement member having a second position clearing said location stops during said longitudinal movement; and,
   means mounting said engagement member on said traveling gauge assembly for movement between said first position and said second position to selectively engage said respective location stops during said longitudinal movement.

8. The invention of claim 7, wherein said locking mechanism of said each respective location stop includes means for forcing said location stops against said track for securing said location stops in selected positions of adjustment on said track.

9. The invention of claim 7, wherein each said location stop comprises two threaded parts drawn together against said track by rotating one of said parts.

10. The invention of claim 7, wherein said engagement member is releasably biased toward said first position for engaging said location stops.

11. The invention of claim 7, further including a pneumatic actuating device for moving said engagement member between said first and second positions.

12. The invention of claim 7, wherein said guiding means defines a three sided channel extending through said traveling gauge assembly for receiving and riding on said fence, and further including a pressure bar in said channel biased to engage said fence to stabilize said gauge assembly on the fence.

13. The invention of claim 12, wherein said traveling gauge assembly includes means for releasably securing accessories to said traveling gauge assembly.

14. An adjustable work-stop assembly comprising:
   an elongate track defining a longitudinal direction;
   a plurality of location stops spaced in said longitudinal direction on said track, said location stops including means for adjusting the relative longitudinal spacing between said respective location stops in said longitudinal direction;
   a gauge assembly for locating a work piece, said gauge assembly including means for constraining said gauge assembly to movement in said longitudinal direction, said gauge assembly further including means for selectively intercepting and releasing said location stops during said movement of said gauge assembly in said longitudinal direction, thereby selectively to define a plurality of work location positions of said gauge assembly.

15. The invention of claim 14, wherein said gauge assembly includes a plurality of attachment means for securing accessories to said gauge assembly.

16. An adjustable work-stop assembly comprising:
   an elongate track;
   an abutment element supported for longitudinal adjustment against said track parallel to said track, said abutment element including a locking mechanism for securing said abutment element in a selected position of adjustment;
   a stop block moveable relative to said abutment element against said track parallel to said track; said movement in a first direction moving said stop block toward and beyond said abutment element in said selected position of adjustment;
   a contact member mounted on said stop block for movement relative to said abutment element and perpendicular to said track between a first position and a second position, said contact member in said first position engaging said abutment element when said stop block moves in said first direction, blocking said movement of said stop block and thereby establishing said stop block in a work locating position, said contact member in said second position clearing said abutment element when said stop block moves in said first direction, permitting said movement of said stop block beyond said abutment element and thereby removing said stop block in said first direction from said work locating position.

17. The invention of claim 16, wherein said track includes a T-slot running lengthwise of said track, and said abutment element includes a first portion captured in said T-slot and a second portion defining an abutment head engageable by said contact member outside said T-slot.

18. The invention of claim 17, wherein said abutment element includes means for drawing said first and second portions against said track releasably securing said abutment element in a fixed position on said track.

19. An adjustable work stop assembly for use with an elongate work fence; said assembly comprising:
   a location stop adjustable parallel to the fence, said location stop including means for anchoring said location stop in selected positions of adjustment along said fence;

a work stop moveable relative to said location stop, said work stop including means for constraining said work stop to longitudinal movement parallel to the fence; and, an engagement arm including means mounting said engagement arm on said work stop for displacement relative to said location stop between a first position and a second position:

said engagement arm in said first position intercepting said location stop during said longitudinal movement thereby to establish said work stop in a work locating position;

said engagement arm in said second position clearing said location stop during said longitudinal movement thereby to release said work stop from said work locating position.

* * * * *